United States Patent [19]

Higashiyama

[11] 4,410,938

[45] Oct. 18, 1983

[54] COMPUTER MONITORING SYSTEM FOR INDICATING ABNORMALITIES IN EXECUTION OF MAIN OR INTERRUPT PROGRAM SEGMENTS

[75] Inventor: Kazuhiro Higashiyama, Atsugi, Japan

[73] Assignee: Nissan Motor Company, Limited, Kanagawa, Japan

[21] Appl. No.: 136,403

[22] Filed: Apr. 1, 1980

[30] Foreign Application Priority Data

Apr. 2, 1979 [JP] Japan ................................. 54-38399

[51] Int. Cl.$^3$ .................. G06F 9/46; G06F 11/32; G06F 9/40; G06F 11/30
[52] U.S. Cl. ................................. 364/200; 371/19; 371/62; 364/431.04; 364/431.11; 364/300; 364/550
[58] Field of Search ... 364/200 MS File, 900 MS File, 364/551, 550, 431.04, 431.11, 300; 371/4, 6, 9, 12, 14, 16, 19, 61, 62; 340/147 LP

[56] References Cited

U.S. PATENT DOCUMENTS

| | | | |
|---|---|---|---|
| 3,312,951 | 4/1967 | Hertz | 364/200 |
| 3,504,347 | 3/1970 | Harmon et al. | 364/200 |
| 3,566,368 | 2/1971 | De Blauw | 364/200 |
| 3,568,157 | 3/1971 | Downing | 364/200 |
| 3,593,299 | 4/1971 | Driscoll | 364/200 |
| 3,644,936 | 2/1972 | Holtwick et al. | 364/300 |
| 3,749,897 | 7/1973 | Hirvela | |
| 3,795,800 | 3/1974 | Nimmo | 371/12 |
| 3,795,916 | 3/1974 | Wallace et al. | 364/300 |
| 3,919,533 | 11/1975 | Einolf, Jr. et al. | |
| 3,996,567 | 12/1976 | Avsan | 364/200 |
| 4,044,337 | 8/1977 | Hicks et al. | 371/12 |
| 4,045,661 | 8/1977 | Antoine et al. | 371/12 |
| 4,072,852 | 2/1978 | Hogan et al. | 364/900 |
| 4,118,792 | 10/1978 | Struger et al. | 364/900 |
| 4,145,735 | 3/1979 | Soga | 364/200 |
| 4,213,178 | 7/1980 | Diez et al. | 364/200 |
| 4,218,739 | 8/1980 | Negi et al. | 364/200 |
| 4,231,106 | 10/1980 | Heap et al. | 364/900 |
| 4,255,789 | 3/1981 | Hartford et al. | 364/431.06 |
| 4,270,168 | 5/1981 | Murphy et al. | 364/200 |
| 4,275,458 | 6/1981 | Khera | 364/900 |
| 4,282,573 | 8/1981 | Imai et al. | 364/431.11 |
| 4,323,966 | 4/1982 | Whiteside et al. | 364/200 |

FOREIGN PATENT DOCUMENTS

| | | | |
|---|---|---|---|
| 1502184 | 2/1978 | United Kingdom | |
| 1546563 | 5/1979 | United Kingdom | |
| 2058406 | 4/1981 | United Kingdom | 364/431.11 |

OTHER PUBLICATIONS

Multifunction Timer, M. N. Cianciosi et al., IBM Technical Disclosure Bulletin, vol. 19, No. 11, Apr. 1977, pp. 4366-4367.
"*Prozebrechner*", by Anke, Kaltenecker, and Oetker published by Oldenbourg, 1970, pp. 424-429.
IEEE Transactions on Computers, vol. C-24, No. 5, mai 1975, N.Y. (US) Alan M. USAS: "A Totally Self--Checking Checker Design for the Detection of Errors in Periodic Signals", pp. 483-489.

*Primary Examiner*—James D. Thomas
*Assistant Examiner*—Archie E. Williams
*Attorney, Agent, or Firm*—Lowe, King, Price & Becker

[57] ABSTRACT

A watchdog-type fail-safe system monitors program execution by a computer used, e.g., in controlling operation of an automative vehicle engine. The system includes a control unit, with a microprocessor; and a memory, which stores program segments. These segments include a main routine for performing a background job (BGJ), and a plurality of interrupt routines for handling event generated interrupts. Completion of the BGJ causes transition of an emergency decision signal, provided by the control unit, to a first level. Initiation of a particular first interrupt routine causes transition of the decision signal to a second level. Abnormalities in program execution may result in non-transition of the decision signal. If there is non-transition of the decision signal for greater than a predetermined reference time period, a fault condition signal is generated. This may initiate various emergency procedures, e.g., stopping or resetting the computer, and visual or audio alarms. Detectable abnormalities include; non-return to the BGJ from any one of the interrupt routines; non-completion of the BGJ due to an excessive number of interrupts, as might occur due to unusually high engine speed; or non-advancement to processing of an interrupt, even though the control unit accepted a valid interrupt demand, as might occur due to temporary troubles in vibration susceptible signal lines between the computer and engine.

8 Claims, 3 Drawing Figures

COMPUTER MONITORING SYSTEM FOR INDICATING ABNORMALITIES IN EXECUTION OF MAIN OR INTERRUPT PROGRAM SEGMENTS

BACKGROUND OF THE INVENTION

1. Field of the Invention

This invention relates to a digital computer for use in controlling the operation of an automotive vehicle internal combustion engine and, more particularly, to a fail-safe system for use with such a digital computer.

2. Description of the Prior Art

In recent years, stored program digital computers have widely been used in various control systems. Such a control system has been found advantageous in the ease with which a variety of sophisticated controls can be handled, but it is subjective to a control program breakage causing a stop of program execution due to disturbances such as external noises when incorporated in an automotive vehicle for controlling the operation of its internal combustion engine.

FIG. 1 is a block diagram showing a typical digital computer contained control system. The control system includes a control unit 4 performing controls in accordance with the program instructions stored in a memory 5. The control unit 4 is normally designed to perform multioperation using interrupt signals which may be generated by interrupt signal generators. Although three interrupt signal generators 1 to 3 are shown in FIG. 1 as generating different types of interrupt signals $S_1$, $S_2$ and $S_3$, respectively, it is to be noted that a desired number of interrupt signal generators may be provided. The control unit 4 may be comprised of a microcomputer which receives interrupt signals $S_1$, $S_2$ and $S_3$ to execute the respective control programs 51, 52 and 53 stored in the memory 5 and receives no interrupt signal to repeatedly execute the control program 54 related to a background job (BGJ).

In order to check execution of the control programs, an attempt may be made to generate a check signal for each program segment, but such an attempt requires a very complex signal processor to handle many interrupts.

SUMMARY OF THE INVENTION

It is therefore one object of the present invention to provide a fail-safe system for use with a computer contained control system which monitors program execution and performs automatical emergency processing.

BRIEF DESCRIPTION OF THE DRAWINGS

The invention will be described in greater detail by reference to the following description taken in connection with the accompanying drawings in which.

DESCRIPTION OF THE PREFERRED EMBODIMENT

Figure 1:
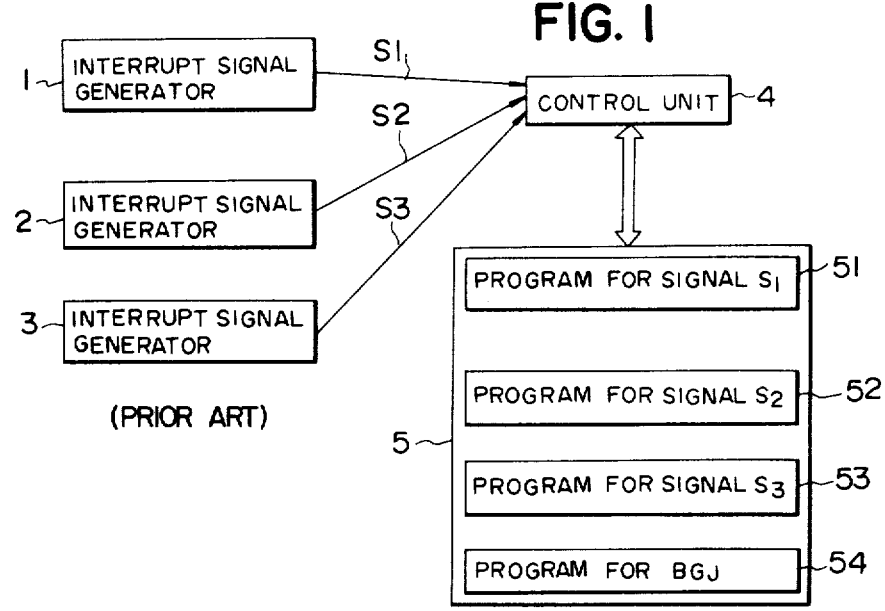
FIG. 1 is a block diagram showing a conventional computer contained control system.
Figure 2:
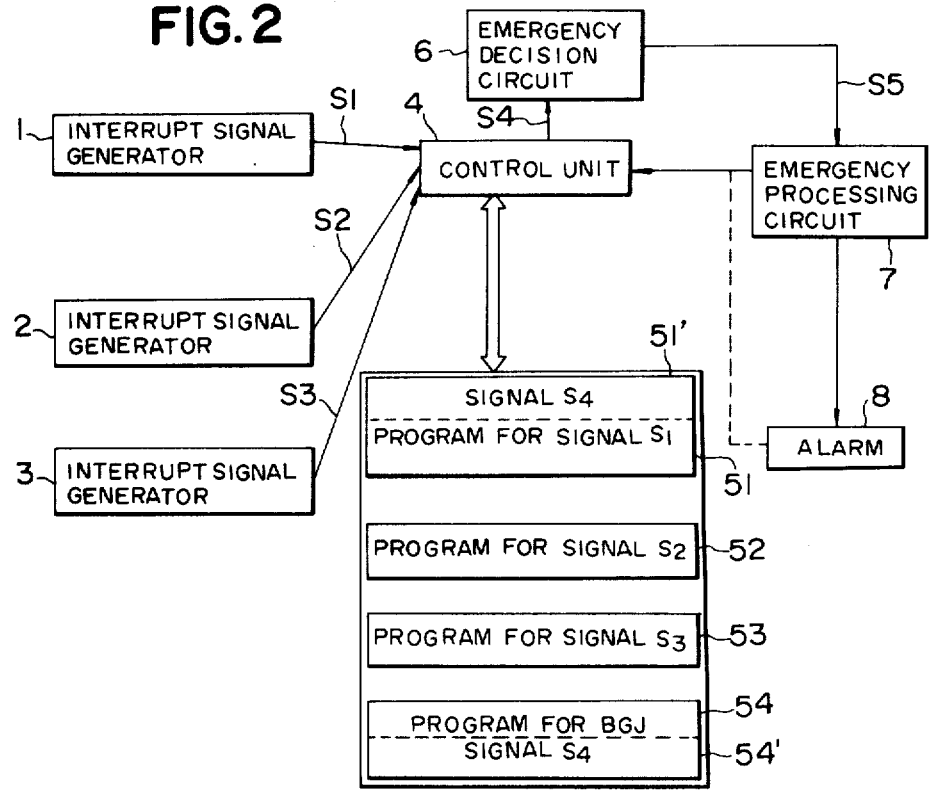
FIG. 2 is a block diagram showing a computer contained control system with a fail-safe system made in accordance with the present invention.

Referring now to FIG. 2 in which like reference numerals indicate like components with respect to FIG. 1, the control unit 4 provides an emergency decision signal $S_4$ having low and high levels to an emergency decision circuit 6 which generates at its output an emergency signal $S_5$ when the time during which the emergency decision signal $S_4$ is held at its low or high level exceeds a predetermined value; that is, any abnormal condition occurs in the control system. For example, the emergency decision circuit 6 may be comprised of charge and discharge means adapted to charge and discharge with a predetermined time constant, and comparator means adapted to provide an emergency signal $S_5$ when the output of the charge and discharge means is above a first predetermined level or below a second predetermined level lower than the first predetermined level.

The output of the emergency decision circuit 6 is coupled to an emergency processing circuit 7. The emergency processing circuit 7 is responsive to an emergency signal $S_5$ to perform emergency processing which may include, solely or in combination, (1) resetting the control unit 4, (2) stopping the operation of the control unit 4, and (3) operating an alarm means 8 such for example as an alarm buzzer, alarm lamp, or the like to inform the occurrence of the abnormal condition.

The program 51 to be executed upon occurrence of an interrupt signal $S_1$ has at its top portion a program segment 51' to change the emergency decision signal $S_4$ to its high level. The background job performing program 54 has at its end portion a program segment 54' to change the emergency decision signal $S_4$ to its low level.

Figure 3:
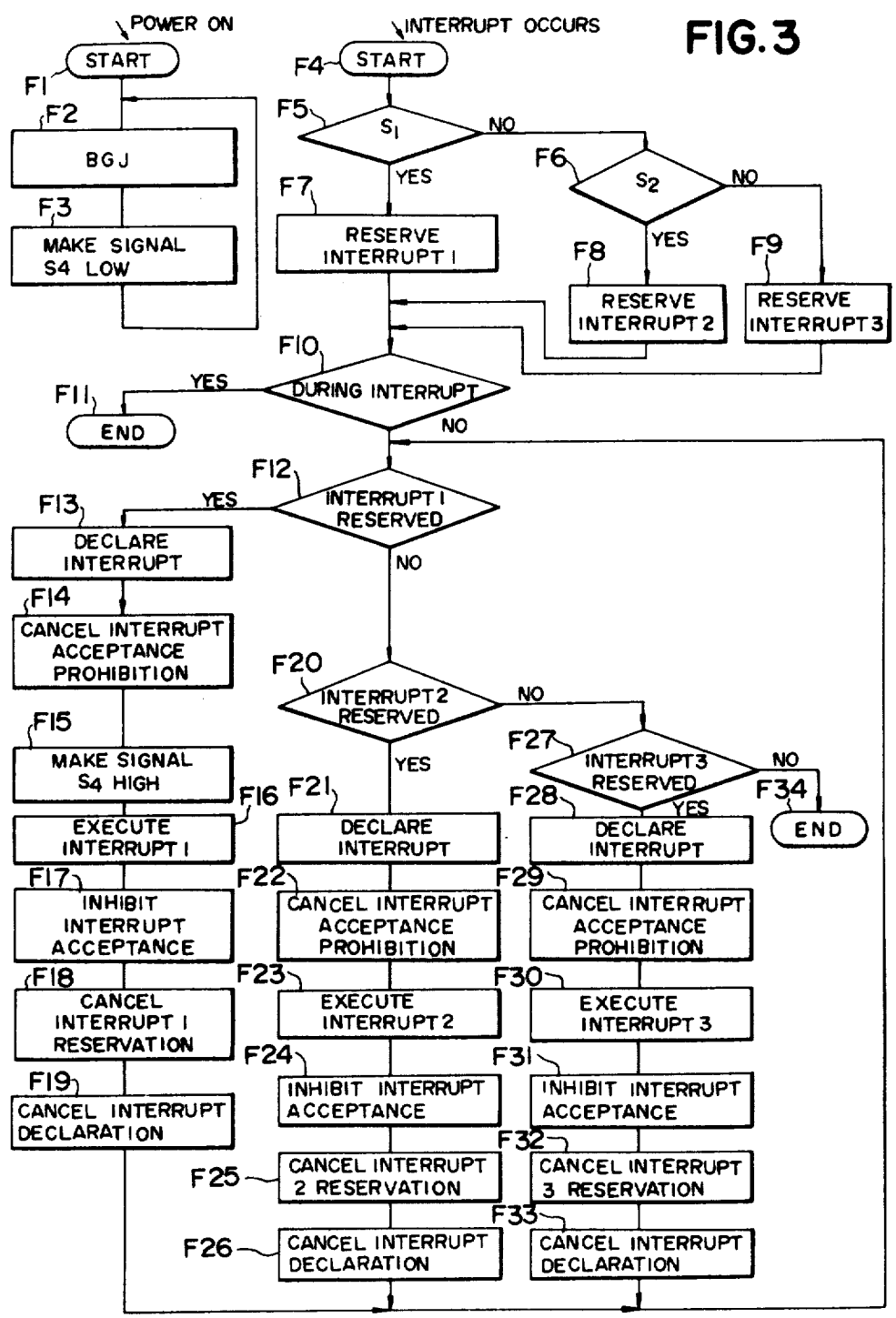
FIG. 3 is a flowchart used in explaining the operation of the present invention.

Referring now to the flowchart of FIG. 3, the operation of the present invention will be described. The block $F_1$ of the flowchart is selected as the start thereof when the power switch is turned on and the control unit 1 receives no interrupt signal. The next block $F_2$ on the flowchart indicates performance of the background job (BGJ) which is schematically represented at 54 in the program memory 5. After performing the background job in accordance with the block $F_2$ of the flowchart, the emergency decision signal $S_4$ is changed to its low level at the block $F_3$ of the flowchart. That is, the emergency decision signal $S_4$ is changed to its low level upon every completion of the background job. The program segments relates to the blocks $F_2$ and $F_3$ of the flowchart are connected in loop fashion so that they are executed repeatedly until the power switch is turned off.

If any interrupt signal is applied from the interrupt signal generators 1 to 3, the block $F_4$ is selected as the start of the flowchart. The next block $F_5$ on the flowchart indicates performance of a routine to determine whether the applied signal is the interrupt signal $S_1$ fed from the first interrupt signal generator 1. If it is, then control is transferred to the block $F_7$ through the program branch labelled YES, in which block the interrupt 1 is reserved. Otherwise, control is transferred from the block $F_5$ along the NO program branch into the block $F_6$ in which a routine is performed to determine whether the applied signal is the interrupt signal $S_2$ fed from the second interrupt signal generator 2. If the interrupt signal $S_2$ is applied to the control unit 4, control is transferred to the block $F_8$ through the YES program branch, in which block the interrupt 2 is reserved. If an interrupt signal $S_3$ is applied from the third interrupt signal generator 3 to the control unit 4, control is transferred through the NO program branch to the block $F_9$ in which the interrupt 3 is reserved.

Upon completion of these routines, control is transferred to the block $F_{10}$ in which a routine is performed to determine whether any interrupt is being handled. If it is, the interrupt processing is terminated at the block $F_{11}$. If no interrupt is handled, control is transferred to the block $F_{12}$ in which a routine is performed to determine whether the interrupt 1 with the highest priority-level is reserved. If the interrupt 1 is reserved, the program control will sequentially flow through the blocks $F_{13}$ to $F_{19}$ of the flowchart. Otherwise, control is transferred to the block $F_{20}$ in which a routine is performed to determine whether the interrupt 2 with the second priority is reserved. If it is, the program control will sequentially flow through the blocks $F_{21}$ to $F_{26}$ of the flowchart. Otherwise, control is transferred to the block $F_{27}$ in which a routine is performed to determine whether the interrupt 3 with the third priority is reserved. If the interrupt 3 is reserved, the program control will sequentially flow through the blocks $F_{28}$ to $F_{33}$ of the flowchart. Otherwise, the interrupt processing is terminated at the block $F_{34}$. Upon completion of the routine at the block $F_{19}$, $F_{26}$ or $F_{33}$, control is returned to the block $F_{12}$. If all of the reserved interrupts are handled, the interrupt processing is terminated at the block $F_{34}$.

The block $F_{13}$ indicates declaration of the state that the interrupt 1 is being handled. After the declaration, control is transferred from the block $F_{10}$ along the YES program branch to the block $F_{11}$ until the declaration is cancelled at the block $F_{19}$. The block $F_{14}$ indicates cancellation of interrupt acceptance prohibition to allow the other interrupts 2 and 3 to be reserved, although not handling them, until the interrupt acceptance is prohibited at the block $F_{17}$. In case where several types of interrupts occurs frequently and it is undesirable to ignor any interrupt, this is advantageous over conventional microcomputer contained control system where any interrupt is inhibited after an interrupt occurs once until the interrupt is terminated. At the block $F_{15}$ the emergency decision signal $S_4$ is changed to its high level which is held until the emergency decision signal $S_4$ is changed to its high level at the block $F_3$ after completion of the interrupt processing. The block $F_{16}$ indicates performance of the interrupt routine corresponding to the interrupt signal $S_1$. Control is transferred from the block $F_{16}$ to the block $F_{17}$ in which a routine is performed to prohibit any interrupt. Then, control is transferred to the block $F_{18}$ in which the reservation of the interrupt 1 is cancelled and, in turn, to the block $F_{19}$ in which the interrupt declaration is cancelled.

The series of blocks $F_{21}$ to $F_{26}$ and the series of blocks $F_{28}$ to $F_{33}$ are substantially similar to the series of blocks $F_{13}$ to $F_{19}$ except that the control unit 4 performs the interrupt routine corresponding to the interrupt signal $S_2$ or $S_3$ without changing the emergency decision signal $S_4$ to its high level.

In this embodiment, the control unit 4 may comprise a microprocessor with a digital output port for reception of the emergency decision signal $S_4$. In order to reserve each interrupt, one bit of the memory may be used as a decision flag. For example, the state where the interrupt is reserved is represented by binary ONE and the state where the reservation of the interrupt is cancelled is represented by binary ZERO. Similarly, one bit of the memory may be used to determine whether the interrupt is being handled.

In the control system of the present invention, the emergency decision signal $S_4$ changes between its high and low levels alternatively if interrupt signals are properly applied to the control unit and the control program is properly executed. However, if the control program stops, for example, during execution of the interrupt 1 for any of reasons, the program segments indicated by the blocks $F_{17}$ and $F_{19}$ are not executed. Consequently, the interrupt acceptance is held permitted and the declaration of the state that the interrupt 1 is being handled is held not cancelled so that the program control always advances to the block $F_{11}$. Similar conditions occur if the control program stops during execution of the interrupt 2 or 3. As a result, the emergency decision signal $S_4$ is held at the level which appears when the program stops. If the control program stops during performing the background job, the emergency decision signal $S_4$ is held at its high level which is established at the block $F_{15}$.

These abnormal conditions can be detected by the use of the emergency decision circuit 6 adapted to provide an emergency signal $S_5$ when the emergency decision signal is held at its one level for a time longer than a predetermined value.

The control system of the present invention includes means for detecting abnormal conditions where the control program stops during interrupt processing or background job performance to perform emergency processing such as resetting the control unit so as to prevent the aggravation of operation of the control system. The abnormal conditions which the control system of the present invention can detect, include the cases where no interrupt is accepted even through the control unit receives any interrupt signal, where the control unit does not properly advance due to temporary troubles in the registers and signal lines, and where frequent interrupts occur to prevent performance of the background job due to occurrence of abnormal conditions in the device to be controlled by the control system such as unusually high engine speeds.

While this invention has been described in conjunction with a specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A system for monitoring program execution in a digital computer adapted to perform a main routine and at least one interrupt routine in response to an interrupt command signal generated during execution of the main routine in response to the occurrence of a particular event, said system comprising:
   (a) first means including said digital computer for providing a decision signal with first and second levels, said digital computer being adapted to provide a transition of the signal to the first level upon termination of the main routine and to provide a transition of the signal to the second level upon beginning of the interrupt routine;
   (b) means for developing a predetermined reference time period;
   (c) means for measuring a period of time during which said decision signal is held without transition at either the first or second levels; and
   (d) second means for generating a signal indicative of a fault condition in said digital computer in response to the decision signal being held without transitions at either the first level or the second level for a time greater than the reference time period.

2. A system according to claim 1, wherein said digital computer performs a plurality of interrupt routines and changes the decision signal to its second level at the beginning of a selected one of the interrupt routines.

3. A system according to claim 1, which further comprises means responsive to the fault condition indicative signal for resetting said digital computer.

4. A system according to claim 1, which further comprises means responsive to the fault condition indicative signal for stopping operation of said digital computer.

5. A system according to claim 1, which further comprises means responsive to the fault condition indicative signal for providing an indication of a fault condition in said digital computer.

6. A system according to claim 5, wherein said means for providing a fault condition indication is adapted to turn on an electric light.

7. A system according to claim 5, wherein said means for providing a fault condition indication is adapted to produce a sound.

8. A system according to claim 7, wherein said means for providing a fault condition indication is adapted to sound a buzzer.

* * * * *